Patented May 25, 1943

2,319,959

UNITED STATES PATENT OFFICE 2,319,959

ADHESIVE

Hubert J. Tierney, Mahtomedi, Minn., assignor to Minnesota Mining & Manufacturing Company, St. Paul, Minn., a corporation of Delaware No Drawing. Application February 19, 1941, Serial No. 379,639

10 Claims. (Cl. 260—4)

This invention relates to an adhesive or cement composition adapted to form normally tacky and pressure-sensitive adhesive coatings; and this application is a continuation-in-part of my applications Serial No. 177,094, filed November 29, 1937, and Serial Nos. 265,794 and 265,795, filed April 3, 1939.

An object of the invention is to provide an adhesive composition which may be applied to a wide variety of surfaces to form an adherent adhesive coating, including paper, leather, glass, resin films, rubber, cellulosic films, etc. The adhesive coating formed upon evaporation of the vehicle is normally tacky and pressure-sensitive, that is, under ordinary atmospheric conditions the adhesive coating is stably in a condition such that it does not need to be activated by heat or solvents or be otherwise prepared in order to exert an adhesive action.

Thus the adhesive composition may be spread upon a backing to form a stable tacky adhesive coating upon evaporation of the vehicle, permitting the backing to be pressed against a desired surface to secure immediate complete adhesion without waiting for any drying or setting action. In this case the adhesive with the backing to which it was first applied may be stripped from the second surface without leaving a residuum of adhesive thereupon, for the adhesive coating is most firmly united to the surface to which applied in dispersed form (since a more intimate contacting is effected), and the final adhesive coating possesses a degree of internal cohesiveness greater than the adhesiveness of its surface.

A particular object is to provide an adhesive composition which will form substantially colorless, clear, transparent adhesive coatings characterized by a high degree of resistance to aging and to discoloration upon exposure to sunlight, and which may be used to provide a highly "invisible" bond. The present type of adhesive forms coatings which are definitely clearer than those comprised of latex crepe and rosin or ester gum, and has an aging life 2-10 times or more as great. While these adhesives may be compounded to form colorless coatings, which deserve to be called "water-white," a dye may be included so as to result in clear but colored transparent coatings, or a pigment may be included so as to result in opaque coatings.

The primary components of the adhesive composition of the present invention are: (A) a special type of hydrogenated indene-coumarone type resin used for imparting tackiness, (B) an elastomer base comprising rubbery polyisobutylene, which is compatible with said resin and rendered tacky thereby, and (C) a volatile vehicle in which the foregoing are dispersed together with such additional materials as may be included.

The "elastomer" base provides a tough and cohesive, flexible and stretchable, elastic body for the adhesive. "Elastomer" signifies natural rubber and equivalent rubber-like polymers of high molecular weight, the generic classification of which is recognized in the rubber and synthetic resin arts because of distinctive similarities. (As to the usage of the term "elastomer," see Industrial and Engineering Chemistry, vol. 31, pages 941–945, August, 1939.) The present application deals particularly with the use of an elastomer base of rubbery poly-isobutylene, which may be replaced in part with other elastomers such as natural rubber, as hereinafter more fully discussed.

The special type of hydrogenated indene-coumarone type resin referred to above, used in accordance with this invention, is a pale solid hydrogenated indene-coumarone type resin having a "solubility index" lower than 0° C. The term "solubility index" is used to denote the cloud point of a 20% solution (by weight) of the resin in Stoddard solvent, i. e. the temperature at which a cloud or precipitate forms when such a solution is gradually cooled from a higher temperature. Stoddard solvent is a colorless refined petroleum benzine having a boiling point range of about 154°–202° C. (specifications have been outlined in U. S. Bureau of Standards booklet CS3–28).

The term "indene-coumarone type resins" is used as a convenient generic term, in conformity with recognized usage, to designate a resin formed by polymerization of the following resin-forming constituents of crude aromatic naphtha (as produced in gas and coke manufacture), viz: indene, coumarone and dicyclopentadiene. The term thus specifies indene resins, coumarone resins, dicyclopentadiene resins, and combinations thereof, since the composition or relative proportions depends upon the type of crude naphtha and the treatment given to it, which may include the selective production of a particular one of these resins with little or no inclusion of the others, although generally all will be present. The invention of course is not dependent upon the use of resins manufactured from a particular raw material source and includes resins of the same composition however made.

Indene-coumarone type resins are not in themselves good tack-producing resins for combining with rubber or the like in making pressure-sensitive adhesives which conform to modern standards of quality. They are not only dark-colored, but cause the adhesive to have a poor aging life and, still worse, are of such limited solubility in rubber and tack-producing quality that highly aggressive adhesives cannot be made, and if a substantial proportion is used there is no improvement and the resin will crystallize out in the adhesive coating so as to produce a blotchiness or opaqueness which is highly objectionable in transparent adhesives. These resins also have a very pronounced "gas works" or coal tar odor, which causes adhesives made therefrom to have a very objectionable odor.

By proper hydrogenation all of these undesirable characteristics are eliminated and the hydrogenated resin can be used in making clear, transparent pressure-sensitive adhesives of very high quality.

There appear to be three zones of hydrogenation in these polymers such that hydrogenation in each zone produces distinctive results. Hydrogenation in "zone 1" results in a pale color, resistance to oxidation, and inhibition of fulvene reactions which cause darkening, such hydrogenation occurring in the five-membered terminal ring. Hydrogenation in "zone 3" results in a great improvement of solubility in rubber and the like, an improvement in tack-producing quality, and greater resistance to after-yellowing. This hydrogenation apparently involves the removal of exposed double bonds in the six-membered rings of the polymer. It also results in an increase of solubility in petroleum solvents, and hence reduction of the cloud point in Stoddard solvent may be used as a measure of the degree of completeness of zone 3 hydrogenation. Thus a particular indene type resin before hydrogenation may have a "solubility index" of over plus 50° C., while after 90% hydrogenation in zone 3 there is a reduction to below minus 50° C. Hydrogenation of zone 1 has little effect upon solubility and tack-producing qualities. "Zone 2" signifies "buried" double bonds, the hydrogenation of which is apparently of little importance from the present standpoint.

Hydrogenation of the indene-coumarone type resin may be effected with Raney nickel catalyst. Hydrogenation of zone 1 occurs easily, to an effective degree at least, but more drastic measures must be used to hydrogenate zone 3. By using a percentage of catalyst of 10%, a temperature close to 225° C., and hydrogen pressures of the order of 1000 lbs. per sq. in., substantially complete hydrogenation of zone 3 can be secured, as well as effective hydrogenation of zone 1. Hydrogenation of zone 2 also occurs but is not believed of importance. Descriptions of hydrogenation techniques will be found in the U. S. patent to Carmody, No. 2,152,533, issued March 28, 1939, and in Industrial and Engineering Chemistry, vol. 32, pages 684-692 (May, 1940).

The melting point of the hydrogenated resin should preferably be at least 70° C., as I have discovered that solid resins having a melting point of this much or higher are superior tack-producers in comparison with the soft resins of lower melting point. To obtain the highest effectiveness, the melting point should be as high as possible, and a valuable feature of the present type of resin is that it can be produced in such high polymeric form as to have a melting point of 150° C. or even higher.

A representative resin which is commercially available is "Nevillite resin" (sold by the Neville Co., Pittsburgh). This comes in various grades of prime-white and water-white clarity (No. 123 grade and V grade, for example). The solid resin is transparent, has a "resinous" feel resembling that of rosin, and is hard and brittle in the higher melting-point ranges. It is unsaponifiable, has a negligible acid number and a low degree of unsaturation, and is highly resistant to oxidation and to yellowing. This resin is not only highly effective as a tack-producer but makes for long aging of adhesives, and because of its highly colorless nature and high compatibility with rubber and the like permits of securing very effective adhesive coatings of high transparency and freedom from color. These Neville resins are believed to be made from a predominately indene polymer, including also a coumarone polymer in minor proportion, which has been hydrogenated to the extent of at least about 50% in zone 1 and at least about 90% in zone 3; and have solubility indexes of minus 50° C. or lower. They can be obtained in grades of 145°–150° C. melting point or higher, and in this grade there are probably close to seven monomer units in the polymer chain, with a molecular weight of the order of 800.

It will be evident that though the hydrogenated resins hereinbefore described may be made with use of ordinary indene-coumarone type resins as raw material, that they differ from the latter in kind and not merely in degree.

The poly-isobutylene elastomer may possess a molecular weight of 25,000 or higher, in which range it is flexible, tough and elastic ("rubbery"), and is colorless and transparent, so that many forms bear a close resemblance to white crepe rubber. This resin is a linear hydrocarbon polymer having a negligible degree of unsaturation. Hence it does not readily oxidize, and may be combined with rubber to make an elastomer combination far superior to rubber in aging properties. Lower polymers of isobutylene lack sufficient toughness and firmness, and are sticky and soft or viscous. These poly-isobutylene elastomers are available on the market under the name "Vistanex" (also "polybutene"), sold by Advance Solvents and Chemical Corp., of New York city.

In general, a proportion of 20-90 parts by weight of the tack-producing resin to 100 parts of the poly-isobutylene will be found most suitable, but variations outside of this range are useful for some purposes, particularly if modifiers are present.

The pale solid hydrogenated indene-coumarone tack-producing resin is highly compatible with the poly-isobutylene elastomer and in addition is compatible with and produces tack in other elastomers which may be substituted for part of the poly-isobutylene.

Thus a combination of poly-isobutylene elastomer and natural latex rubber has proved of value. The latex rubber provides a firm and tough softener or plasticizer for the poly-isobutylene, without causing lack of cohesive strength such as would result if an ordinary plasticizer were used in amount sufficient to produce equivalent results.

Thus the combination is not a mere addition of equivalents since each contributes to the other. As illustrative of suitable proportions within which each component functions to a substantial extent in contributing its own benefit, the elastomer base of the adhesive may contain 20-80% of the poly-isobutylene and 80–20% of the rubber. The hydrogenated indene-coumarone type resin, employed in conjunction as the tack-producer, appears to act as a mutual solvent so as to result in a three-way blend or solid solution which is stably homogeneous. This is mentioned since the rubber and poly-isobutylene, alone, are not completely miscible with each other in a solution sense, and hence blends deposited as a film from solution in a volatile solvent are cloudy even when equal parts are present. Hence the hydrogenated indene-coumarone type resin makes for full compatibility and clear transparency.

A further example of a compatible elastomer is "neoprene" (polychloroprene).

The firmness and cohesive strength of the poly-isobutylene polymer and of the adhesive may also be increased by incorporation of a minor proportion of "cyclized rubber," which term designates the reaction product of rubber and a halogenated acid of tin, such as chlorostannic acid, and which is commercially available, as illustrated by "Pliolite" (or "Plioform") sold by Goodyear Tire & Rubber Co. See U. S. Patent to Sebrell, No. 2,052,423. Thus 1 part of cyclized rubber may be advantageously combined with 3 parts of poly-isobutylene, for example.

The solid hydrogenated indene-coumarone type resin may be substituted for in part by another tack-producing resin which is compatible with it and the other components of the adhesive. In this connection particular mention is made of "rosin type resins," a generic term used to denote not only rosin but modified forms containing the abietate radical, illustrated by the following examples: wood and gum rosin; ester gum made from either wood or gum rosin (preferably of low-acid type); hydrogenated rosin ester; hydrogenated rosin; zinc abietate and calcium abietate; "Pentalyn" (pentaerythrityl abietate resin having a melting point of about 115° C. and a maximum acid number of about 15, sold by Hercules Powder Co., of Wilmington, Delaware); "Nuroz" (a polymerized rosin sold by Newport Industries, Inc., of New York city); and "Galex W–100" (dehydroabietic acid having a melting point of about 65° C. and a high resistance to oxidation, sold by G. & A. Laboratories, Inc., of Savannah, Georgia).

Examples of other types of tack-producing resins are: "Vistac" (a soft and tacky poly-isobutylene of low molecular weight, sold by Advance Solvents and Chemical Corp., of New York city); solid chlorinated diphenyl (as "Aroclor 5460," sold by Monsanto Chemical Co., of St. Louis, Mo.); "Nypene resin" (a terpene polymer synthetic resin which is a pure hydrocarbon having a hydrogen/carbon atomic ratio of 1.60/1, and a melting point of 140°–150° C., sold by the Neville Co., of Pittsburgh, Pa.) and "Piccolyte" (a pure hydrocarbon thermoplastic terpene resin available in various melting points, of which those of 85° C. and higher are very satisfactory, and having a zero acid number, sold by Pennsylvania Industrial Chemical Corp., of Clairton, Penn.).

Various compatible modifying agents may be included. Thus a small proportion of butyl stearate may be employed to give additional softness. Liquid paraffin oil may be used for this purpose. Other compatible agents exerting a plasticizing action may be used in small proportion where deemed expedient, such as: methyl abietate and hydrogenated methyl abietate; and "Nevinol" and "Nevillite oil," sold by the Neville Co., which are light-colored or colorless plasticizing oils obtained during the production of resins by polymerization of crude solvent naphtha of coal-tar origin, the "Nevinol" being probably composed of approximately equal parts of dimeric polymers of indene and coumarone, and the "Nevillite oil" being a somewhat similar material.

Where rubber is included, a rubber antioxidant is preferably incorporated to render the rubber even more age-resistant and hence to increase the aging life of the adhesive. Examples are beta-naphthol, "Flectol B" (a liquid condensation product of acetone and aniline), "Flectol H" (a solid condensation product of acetone and aniline), "Solux" (para-hydroxy-phenyl-morpholine), "Agerite resin" (aldol-alpha-naphthylamine), "Agerite white" (sym. di-beta-naphthyl-para-phenylene diamine), and "Antox" (a butyraldehyde aniline derivative). Those which are soluble in the adhesive solvent may be added directly, otherwise they may be incorporated by milling into the rubber.

Reinforcing pigments and opacifiers may be included, such as zinc oxide, zinc sulfide and titanium oxide, each of which functions in both capacities. The zinc sulfide is not as good as the zinc oxide for reinforcing, but is much better for opacifying, and hence combinations of the two can be used to advantage. The titanium oxide can be used in place of part or all of these, but may be less desirable in that the aging life of the adhesive will not be so great when rubber is present. Carbon black may be used for this purpose where a black color is not undesirable. The function of the reinforcing pigment, as regards reinforcing action, is to increase the cohesive strength or firmness of the adhesive coating. Colored dyes or pigments may be incorporated for forming colored adhesives.

In the following illustrative examples of adhesive solutions, all parts are by weight.

*Example 1*

| | Parts |
|---|---|
| Poly-isobutylene of 52,000 molecular weight | 100 |
| Zinc oxide (optional) | 50 |
| "Nevillite resin" of 145°–150° C. melting point | 40 |
| "Nevinol," "Nevillite oil," methyl abietate or hydrogenated methyl abietate (optional) | 20 |
| Butyl stearate (optional) | 10 |
| Heptane (volatile solvent) | 700 |

*Example 2*

| | Parts |
|---|---|
| Poly-isobutylene of 115,000 molecular weight | 150 |
| "Pliolite" (cyclized rubber) | 50 |
| Liquid paraffin oil | 50 |
| "Nevillite resin" of 85° C. melting point | 50 |
| Heptane | 750 |

*Example 3*

| | Parts |
|---|---|
| Poly-isobutylene of 115,000 molecular weight | 100 |
| "Vistac" | 50 |
| "Nevillite resin" of 150° C. melting point | 25 |
| Liquid paraffin oil | 40 |
| Heptane | 400 |

*Example 4*

| | Parts |
|---|---|
| Poly-isobutylene of 115,000 molecular weight | 100 |
| "Nevillite resin" of 85° C. melting point | 17 |
| Hydrogenated methyl abietate | 17 |
| Butyl stearate | 13 |
| Heptane | 400 |

Example 5

| | Parts |
|---|---|
| First quality latex crepe | 70 |
| Colorless poly-isobutylene of 52,000 molecular weight | 30 |
| Colorless "Nevillite resin" of 85°–90° C. melting point | 64 |
| Butyl stearate (softener) | 2.3 |
| "Flectol B" (antioxidant) | 0.4 |
| Heptane (volatile solvent) | 1000 |
| Alcohol (viscosity reducer) | 6 |

Example 6

| | Parts |
|---|---|
| First quality latex crepe | 50 |
| Colorless poly-isobutylene of 52,000 molecular weight | 50 |
| Colorless "Nevillite resin" of 85°–90° C. melting point | 32 |
| Colorless "Nevillite resin" of 145°–150° C. melting point | 32 |
| Butyl stearate | 2.0 |
| "Flectol B" | 0.4 |
| Heptane | 1000 |
| Alcohol | 6 |

Example 7

| | Parts |
|---|---|
| First quality latex crepe | 25 |
| Colorless poly-isobutylene of 52,000 molecular weight | 75 |
| Colorless "Nevillite resin" of 85°–90° C. melting point | 40 |
| Butyl stearate | 2.3 |
| "Flectol B" | 0.4 |
| Heptane | 800 |
| Alcohol | 6 |

Example 8

| | Parts |
|---|---|
| First quality latex crepe | 50 |
| Colorless poly-isobutylene of 52,000 molecular weight | 50 |
| Colorless "Nevillite resin" of 85°–90° C. melting point | 15 |
| Colorless "Nevillite resin" of 145°–150° C. melting point | 15 |
| Rosin (preferably No. 10 wood rosin or "water-white" gum rosin) or low-acid type ester gum, or other "rosin type resin" | 30 |
| Butyl stearate | 10 |
| "Flectol B" | 1 |
| Heptane | 800 |

Example 9

| | Parts |
|---|---|
| First quality latex crepe | 50 |
| Colorless poly-isobutylene of 52,000 molecular weight | 50 |
| Colorless "Nevillite resin" of 145°–150° C. melting point | 50 |
| Colorless poly-isobutylene of 14,000 molecular weight ("Vistac") | 10 |
| Butyl stearate | 1 |
| "Flectol B" | 0.5 |
| Heptane | 700 |

The alcohol is used as a viscosity-reducer to reduce the quantity of solvent required to produce a solution of desired viscosity, and its use is optional. It may be denatured ethyl alcohol (as official formula No. 1 comprised of 5 parts by volume of approved wood alcohol per 100 parts by volume of 95 vol. % ethyl alcohol), or may be substituted for by methyl alcohol, or by another volatile material which serves the same purpose. The heptane may be replaced by other volatile hydrocarbon solvents or by any volatile solvent in which the components of the adhesive are soluble.

In preparing the adhesive solution, the latex crepe and poly-isobutylene elastomer, when used together, may be milled together on a rubber mill for about 20 minutes, at a temperature of about 165° F., to form a smooth plastic mass. This is cut up and placed in a churn with the other materials and churned until a homogeneous solution is obtained. Otherwise, the poly-isobutylene elastomer is added directly to the churn with the other ingredients.

It will be understood that the proportion of solvent may be varied to produce the desired viscosity of the adhesive composition, and that the relative proportions of the other components may be varied so that the adhesive composition will form coatings of the desired degree of tack or adhesive aggressiveness.

Heptane is given as a preferred example of a volatile solvent, but obviously may be replaced by other volatile hydrocarbon solvents or by any volatile solvent in which the components of the adhesive are soluble or dispersible. Water-dispersions of the adhesive components may be used, thus avoiding use of solvents, or the components may be dissolved in a solvent and this solution dispersed in water by use of an emulsifying agent.

It will also be understood that the embodiments which I have described have been given for purposes of illustration and not limitation.

What I claim is as follows:

1. An adhesive composition comprising a poly-isobutylene elastomer and a pale solid hydrogenated resin of the class consisting of hydrogenated indene resins, coumarone resins, dicyclopentadiene resins and combinations thereof, having a cloud point in a 20% solution in Stoddard solvent lower than 0° C., combined in proportions adapted to form a normally tacky and pressure-sensitive adhesive coating and dispersed in a volatile vehicle.

2. An adhesive composition comprising an elastomer base essentially composed of 20–80 parts of rubber and 80–20 parts of poly-isobutylene of at least 25,000 molecular weight, and a pale solid hydrogenated resin of the class consisting of hydrogenated indene resins, coumarone resins, dicyclopentadiene resins and combinations thereof, having a cloud point in a 20% solution in Stoddard solvent lower than 0° C., combined in proportions adapted to form a normally tacky and pressure-sensitive adhesive coating and dispersed in a volatile vehicle.

3. An adhesive composition comprising a poly-isobutylene elastomer, and a tack-producing resin component comprised of a pale solid hydrogenated resin of the class consisting of hydrogenated indene resins, coumarone resins, dicyclopentadiene resins and combinations thereof, having a cloud point in a 20% solution in Stoddard solvent lower than 0° C., and a compatible tack-producing resin of a different type, combined in proportions adapted to form a normally tacky and pressure-sensitive adhesive coating and dispersed in a volatile vehicle.

4. An adhesive composition comprising a poly-isobutylene elastomer, and a tack-producing resin component comprised of a pale solid hydrogenated resin of the class consisting of hydrogenated indene resins, coumarone resins, dicyclopentadiene resins and combinations thereof, having a cloud point in a 20% solution in Stoddard solvent lower than 0° C., and a compatible tack-producing resin containing the abietate radical, combined in proportions adapted to form a normally tacky and pressure-sensitive adhesive coating and dispersed in a volatile vehicle.

5. An adhesive composition comprising a poly-isobutylene elastomer, and a tack-producing resin component comprised of a pale solid hydrogenated resin of the class consisting of hydrogenated indene resins, coumarone resins, dicyclopentadiene resins and combinations thereof, having a cloud point in a 20% solution in Stoddard solvent lower than 0° C., and a soft tack-producing poly-isobutylene of low molecular weight, combined in proportions adapted to form a normally tacky and pressure-sensitive adhesive coating and dispersed in a volatile vehicle.

6. An adhesive composition comprising a poly-isobutylene elastomer combined with cyclized rubber, which is the reaction product of rubber and a halogenated acid of tin, giving additional firmness, and a pale solid hydrogenated resin of the class consisting of hydrogenated indene resins, coumarone resins, dicyclopentadiene resins and combinations thereof, having a cloud point in a 20% solution in Stoddard solvent lower than 0° C., combined in proportions adapted to form a normally tacky and pressure-sensitive adhesive coating and dispersed in a volatile vehicle.

7. An adhesive composition comprising a poly-isobutylene elastomer and, for each 100 parts thereof, 20–90 parts of a pale solid hydrogenated resin of the class consisting of hydrogenated indene resins, coumarone resins, dicyclopentadiene resins and combinations thereof, having a cloud point in a 20% solution in Stoddard solvent lower than 0° C., and a softener, adapted to form a normally tacky and pressure-sensitive adhesive coating and dispersed in a volatile vehicle.

8. An adhesive composition comprising a poly-isobutylene elastomer of at least 25,000 molecular weight, and a pale solid hydrogenated resin of the class consisting of hydrogenated indene resins, coumarone resins, dicyclopentadiene resins and combinations thereof, having a cloud point in a 20% solution in Stoddard solvent at least as low as about −50° C. and a melting point of at least 70° C., adapted to form a normally tacky and pressure-sensitive adhesive coating and dissolved in a volatile petroleum solvent.

9. An adhesive composition adapted to form clear transparent pressure-sensitive adhesive coatings, comprising a poly-isobutylene elastomer of at least 25,000 molecular weight and, for each 100 parts thereof, 20–90 parts of a substantially colorless solid hydrogenated resin of the class consisting of hydrogenated indene resins, coumarone resins, dicyclopentadiene resins and combinations thereof, having a cloud point in a 20% solution in Stoddard solvent lower than 0° C. and a melting point of at least 70° C., dispersed in a volatile vehicle.

10. An adhesive composition adapted to form clear transparent adhesive coatings, comprising a poly-isobutylene elastomer of at least 25,000 molecular weight, a substantially colorless solid hydrogenated indene resin having a cloud point in a 20% solution in Stoddard solvent at least as low as about −50° C. and a melting point of at least about 150° C., and a softener, combined in proportions adapted to form a normally tacky and pressure-sensitive adhesive coating and dissolved in a volatile petroleum solvent.

HUBERT J. TIERNEY.